US012208612B2

(12) United States Patent
Chow et al.

(10) Patent No.: US 12,208,612 B2
(45) Date of Patent: Jan. 28, 2025

(54) MEDIA CARTRIDGE

(71) Applicant: ZEBRA TECHNOLOGIES CORPORATION, Lincolnshire, IL (US)

(72) Inventors: Steve Ting Kei Chow, Monterey Park, CA (US); Angel B. Rosales, Port Hueneme, CA (US); Daniel V. Carroll, Port Barrington, IL (US); Edward Anthony Hackett, Surbiton (GB)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/423,481

(22) Filed: Jan. 26, 2024

(65) Prior Publication Data

US 2024/0165975 A1 May 23, 2024

Related U.S. Application Data

(63) Continuation of application No. 16/844,755, filed on Apr. 9, 2020, now Pat. No. 11,884,062.

(51) Int. Cl.
*B41J 15/04* (2006.01)

(52) U.S. Cl.
CPC .................................. *B41J 15/044* (2013.01)

(58) Field of Classification Search
None
See application file for complete search history.

(56) References Cited

U.S. PATENT DOCUMENTS

| | | | | |
|---|---|---|---|---|
| 3,246,742 | A * | 4/1966 | Coe | B65D 85/672 206/408 |
| 3,613,973 | A | 10/1971 | Jaeschke | |
| 1,033,560 | A | 7/1977 | Frey | |
| 4,431,139 | A | 2/1984 | Barnsbee et al. | |
| 5,178,340 | A * | 1/1993 | Niedospial | G03B 17/30 396/513 |
| 5,245,376 | A | 9/1993 | Takahashi | |
| 6,196,493 | B1 | 3/2001 | Tanaka | |
| 6,457,804 | B1 | 10/2002 | Scholtz et al. | |
| 6,902,134 | B2 | 6/2005 | Green et al. | |

(Continued)

FOREIGN PATENT DOCUMENTS

| | | |
|---|---|---|
| AU | 2014212550 | 9/2015 |
| EP | 0807530 A1 | 11/1997 |

(Continued)

OTHER PUBLICATIONS

Office Action for U.S. Appl. No. 16/844,755 mailed on Sep. 7, 2021.

(Continued)

*Primary Examiner* — Matthew G Marini

(57) ABSTRACT

A media cartridge includes: a base including: a media chamber having a mouth, and a lower portion of a media outlet; first and second wings configured to support a media spool therebetween; and a cover connected between the first and second wings, and including: an upper portion of the media outlet, and a perimeter configured to engage the mouth of the media chamber, to suspend the first and second wings within the media chamber and place the upper portion of the media outlet adjacent to the lower portion of the media outlet.

19 Claims, 18 Drawing Sheets

(56) References Cited

U.S. PATENT DOCUMENTS

| | | | |
|---|---|---|---|
| 7,300,015 | B2 | 11/2007 | Fukushima et al. |
| 8,336,711 | B2 | 12/2012 | Katsurayama et al. |
| 11,051,665 | B2 | 7/2021 | Huang |
| 11,548,302 | B2 | 1/2023 | Malone et al. |
| 2005/0284975 | A1 | 12/2005 | Fukushima et al. |
| 2011/0210198 | A1 | 9/2011 | Case et al. |
| 2012/0027494 | A1 | 2/2012 | Kawashima et al. |
| 2014/0320582 | A1 | 10/2014 | Sauvage et al. |
| 2015/0022611 | A1 | 1/2015 | Taylor et al. |
| 2015/0124037 | A1 | 5/2015 | Terry et al. |
| 2016/0288548 | A1 | 10/2016 | Block et al. |
| 2016/0368290 | A1 | 12/2016 | Sakano |
| 2018/0117935 | A1 | 5/2018 | Oida et al. |
| 2021/0316560 | A1 | 10/2021 | Chow et al. |
| 2023/0158819 | A1 | 5/2023 | Malone et al. |

FOREIGN PATENT DOCUMENTS

| | | | |
|---|---|---|---|
| JP | 3586449 | | 11/2004 |
| WO | 2012098891 | A1 | 7/2012 |
| WO | 2021207456 | | 10/2021 |

OTHER PUBLICATIONS

Office Action for U.S. Appl. No. 16/844,755 mailed on May 30, 2023.

Preliminary Search Report for French Patent Application No. 2103598 mailed on Dec. 12, 2022.

Search Report for Dutch Patent Application No. 2027890 mailed on Nov. 18, 2021.

Novelty Search Report for Belgian Patent Application No. 2021/5281 mailed on Jan. 5, 2022.

International Search Report and Written Opinion for International Application No. PCT/US2021/026322 mailed on Apr. 8, 2021.

Office Action for U.S. Appl. No. 17/071,593 mailed on Apr. 14, 2022.

Novelty Search Report for Belgian Patent Application No. 202105815 mailed on Jul. 6, 2022.

Office Action for U.S. Appl. No. 18/094,932 mailed on Jul. 19, 2023.

International Search Report and Written Opinion for International Application No. PCT/US2021/54720 mailed on Mar. 1, 2022.

* cited by examiner

MEDIA CARTRIDGE

RELATED APPLICATIONS

The present application is a continuation of U.S. patent application Ser. No. 16/844,755, filed on Apr. 9, 2020, which is incorporated by reference herein in its entirety.

BACKGROUND

A media processing device, such as a label printer, may store a supply of media for processing, e.g. by printing or otherwise applying indicia to the media. When the supply of media stored by the media processing device is exhausted, the supply may be replenished by accessing an interior of the device to install a new supply, such as a new roll of labels. Replenishing the supply of media in the above manner, however, may be time-consuming and prone to improper installation of the media, which may negatively impact the performance of the media processing device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
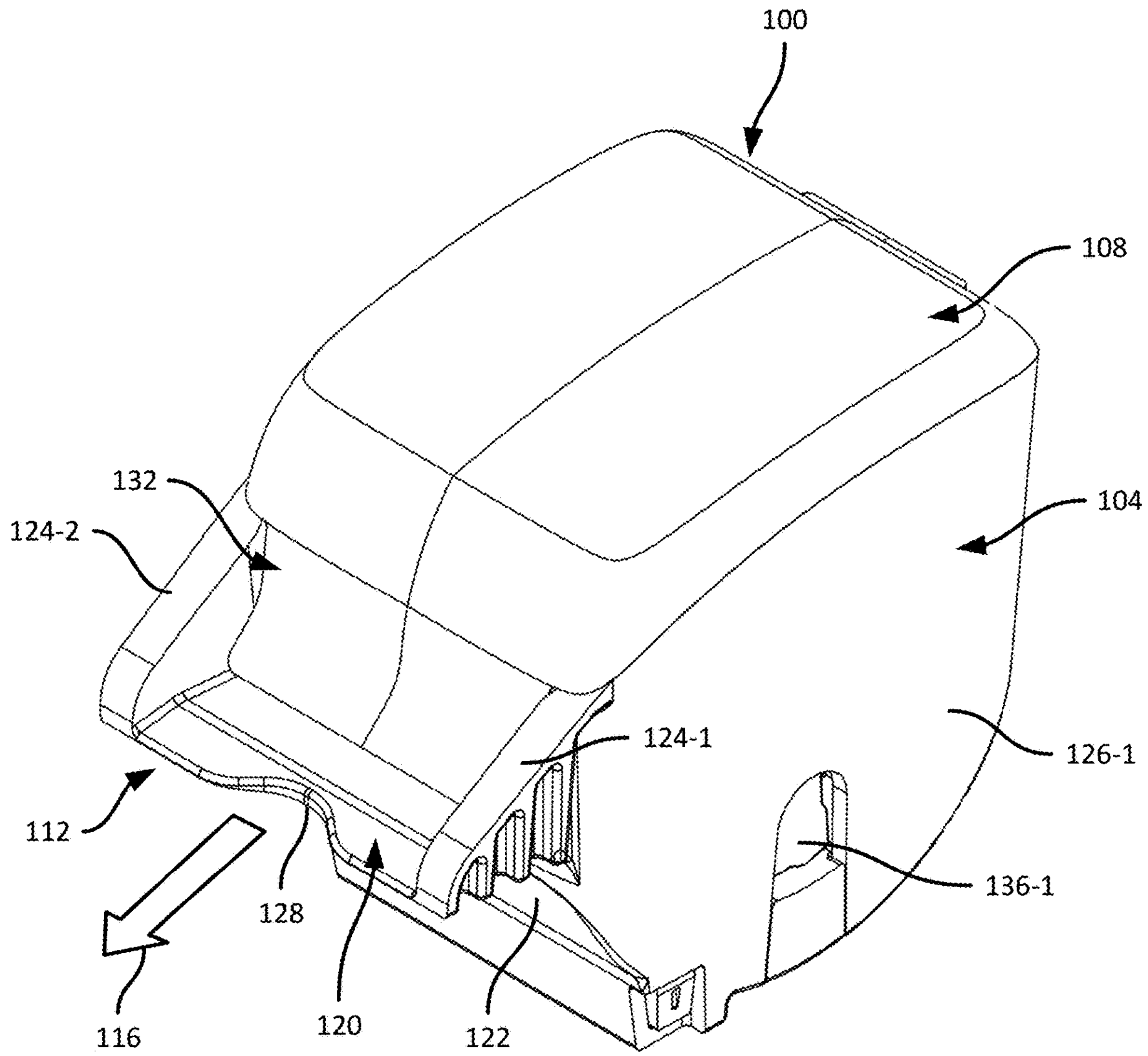
FIG. 1 is an isometric view of a media cartridge, taken from above.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Label printers are often desired for small business use, however for occasional users, the process of loading media may end up being troublesome. Often times, label printers require media to be fed through a system of rollers within the label printer, which adds additional complications to a media loading and unloading process. The description below seeks to remedy these complications through the use of a replaceable media cartridge.

The below described media cartridge includes a media outlet having guide walls. The guide walls aids in alignment of media from the media cartridge which simplifies the design for the label printer/media cartridge combination as the guide walls allows for the media to be dispensed for printing in a relatively straight alignment.

The below described media cartridge includes two sections, a media chamber and a cover having a first wing and a second wing. The first and second wings have a first and a second spindle. The first and second spindle are aligned such that when the media cartridge is assembled, they are opposite each other such that the first and second spindle can retain a roll of media. The first and second spindle being integral parts of the first and the second wing allows for the media cartridge to support the media within the media cartridge without having to include additional parts. This allows for a simplification of the design which allows the media cartridge to be assembled easier for less expensive production.

An issue that arises when first time users attempt to load media is that it can be put in askew or in the wrong direction, which could damage the media cartridge or the printer itself. The below described media cartridge addresses this issue by having alignment features on the rear and lower surface of the media cartridge. The alignment features can be molded direction into the media cartridge itself and make it such that the media cartridge can obviously only fit in one set direction. The alignment features also makes it such that the media cartridge cannot easy shift within the label printer during operation.

Examples disclosed herein are directed to media cartridge, comprising: a base including: a media chamber having a mouth, and a lower portion of a media outlet; first and second wings configured to support a media spool therebetween; and a cover connected between the first and second wings, and including: an upper portion of the media outlet, and a perimeter configured to engage the mouth of the media chamber, to suspend the first and second wings within the media chamber and place the upper portion of the media outlet adjacent to the lower portion of the media outlet.

Additional examples disclosed herein are directed to a media cartridge, comprising: a lower wall having a T-shaped alignment ridge extending therefrom, the alignment ridge configured to cooperate with a complementary lower channel in a printer housing to orient the media cartridge within the printer housing; a rear wall including an alignment spine extending therefrom to cooperate with a complementary rear channel of the printer housing; a set of further walls defining, in cooperation with the lower wall and the rear wall, a media chamber to support a media spool; a media outlet opposite the rear wall, configured to dispense media from the media spool.

FIG. 1 depicts a media cartridge 100, also referred to herein simply as the cartridge 100. The cartridge 100 is configured to store a supply of media, such as a spool of adhesive labels, paper or the like, although the cartridge 100 is illustrated in an empty state in FIG. 1.

The cartridge 100 includes a base 104 that defines a media chamber to contain the above-mentioned media spool. The cartridge 100 also includes a cover 108 that is configured, when the cartridge 100 is assembled as shown in FIG. 1, to engage with the base 104 to enclose the above-mentioned media chamber. The cover 108 is also coupled to internal components of the cartridge 100 that support the media spool, as will be seen below.

The cartridge 100 includes a media outlet 112 from which media is dispensed from the media chamber, e.g. in the direction 116 indicated in FIG. 1. The media may be dispensed from the cartridge 100 under the action of one or more components of a media processing device such as a printer. Examples of such components include a platen roller and a print head that together form a nip through which the media is drawn to be processed and subsequently dispensed from the printer.

The base 104 and cover 108 cooperate to define the media outlet 112 when the cartridge is fully assembled, as shown in FIG. 1. To that end, the base 104 includes a lower portion 120 of the media outlet 112, over which the media travels in the direction 116 to exit the cartridge 100. The lower portion 120 of the media outlet 112 can be integrally formed with a forward wall 122 of the base 104.

In addition, the lower portion 120 can include guide walls 124-1 and 124-2, which may be integrally formed with side walls 126 (a side wall 126-1 is shown in FIG. 1) of the base 104, for structural support of the lower portion 120. The guide walls 124 may also constrain sideways motion of the media (e.g. in the same plane as, but orthogonal to, the direction 116) as the media exist the cartridge 100. The guide walls 124 can include ridges (visible on the outer surface of the guide wall 124-1) to retain structural rigidity while reducing wall thickness.

The lower portion 120 of the media outlet 112 can also include a cutout 128 at a leading edge thereof. The cutout 128, as will be discussed below in greater detail, may allow media traversing the cutout 128 to be exposed to a sensor of the printer when the cartridge is installed in the printer.

The cover 108 includes an upper portion 132 of the media outlet 112 configured to contact an upper surface of the media as the media exits the cartridge, e.g. to mitigate against retraction of the media into the cartridge 100.

The side walls 126 of the cartridge 100, e.g. the side wall 126-1 as shown in FIG. 1, can include respective windows 136 (a window 136-1 is visible in FIG. 1) that expose the interior of the media chamber to the exterior of the cartridge 100. The windows 136 therefore enable an operator to view the media within the cartridge 100, e.g. to assess a remaining quantity of media.

Figure 2:
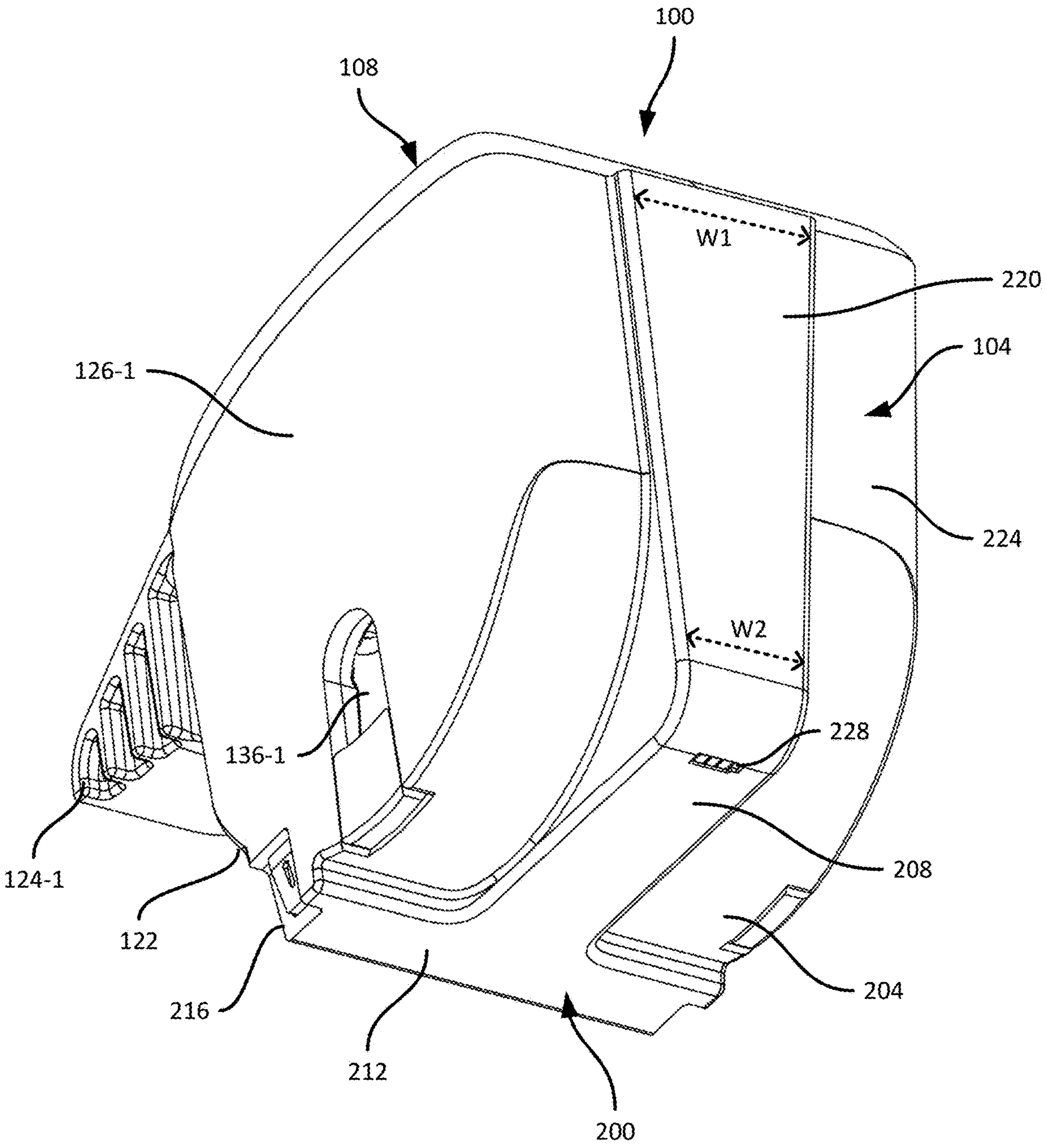
FIG. 2 is an isometric view of the media cartridge of FIG. 1, taken from below.

Turning to FIG. 2, the cartridge 100 also includes structural features to align the cartridge 100 within the printer upon installation. In the illustrated example, the cartridge 100 includes an alignment ridge 200 extending from a lower wall 204 of the base 104. The alignment ridge 200 is configured to engage with a complementary alignment channel of a printer, constraining the alignment of the cartridge 100 as the cartridge 100 is installed in the printer (i.e. preventing installation of the cartridge 100 in an incorrect orientation). In other examples, the alignment ridge 200 can be provided as a channel feature extending into the lower wall 204 rather than extending out from the lower wall 204. In such examples, the complementary structure in the printer can include a ridge configured to engage with the above-mentioned channel.

In the present example, the alignment ridge 200 is a T-shaped ridge that includes a stem 208 and an arm 212. As shown in FIG. 2, a forward surface 216 of the arm 212 is contiguous with the forward wall 122 of the base 104. In other examples, however, the arm 212 can be disposed on the lower wall 204 such that the forward surface 216 is spaced apart (rearwardly) from the forward wall 122. In addition, the arm 212 extends across the width (between the side walls 126) of the base 104 in the present example. In other examples, the arm 212 can have a reduced length, such that the arm 212 extends across only a portion of the width of the base 104.

The stem 208 of the alignment ridge 200 is disposed centrally on the lower wall 204 and orthogonal to the arm 212. The stem 208 extends between the arm 212 and a rear end of the lower wall 204. In other examples, the length of the stem 208 can be reduced. In further examples, the stem 208 can be disposed off-center relative to the arm 212, such that the stem 208 is closer to, for example, the side wall 126-1 than to the opposing side wall 126 (not visible in FIG. 2).

The cartridge 100 also includes an additional alignment feature in the present example, in the form of an alignment spine 220 extending from a rear wall 224 of the cartridge 100. The spine 220, in the present example, is contiguous with the stem 208 and extends from the stem 208 to an upper end of the base 104, adjacent to the cover 108. In addition, the spine 220 is wedge-shaped in the present example, having a larger width W1 near the upper end of the base 104 than a width W2 near the stem 208. The spine 220 is configured to engage with a complementary channel of the printer to guide the cartridge 100 into position as the cartridge 100 is inserted into the printer. In other examples, the spine 220 need not be contiguous with the stem 208. For example, the spine 220 can terminate above the lower wall 204 such that the spine 220 does not reach the stem 208.

In other examples, the alignment ridge 200 can have a variety of shapes other than the T-shaped configuration shown in the drawings. For example, the ridge 200 can be angled to traverse the lower wall 204 in a diagonal direction. In other examples, the ridge 200 can be implemented as a plurality of distinct ridges or bosses, as a curved ridge, and the like.

The cartridge 100 can also include an identification circuit 228 disposed on an outer surface thereof. In the present example, the circuit 228 is disposed on a lower surface of the stem 208 of the alignment ridge 200, adjacent to the spine 220. The circuit 228 can be implemented, for example, as a suitable integrated circuit that is readable by the printer upon installation of the cartridge 100. The circuit 228 can store information such as a unique identifier of the cartridge 100, a manufacturer identifier of the cartridge 100, inventory remaining in the cartridge 100, an encryption key or other authentication data, and the like.

Figure 3:
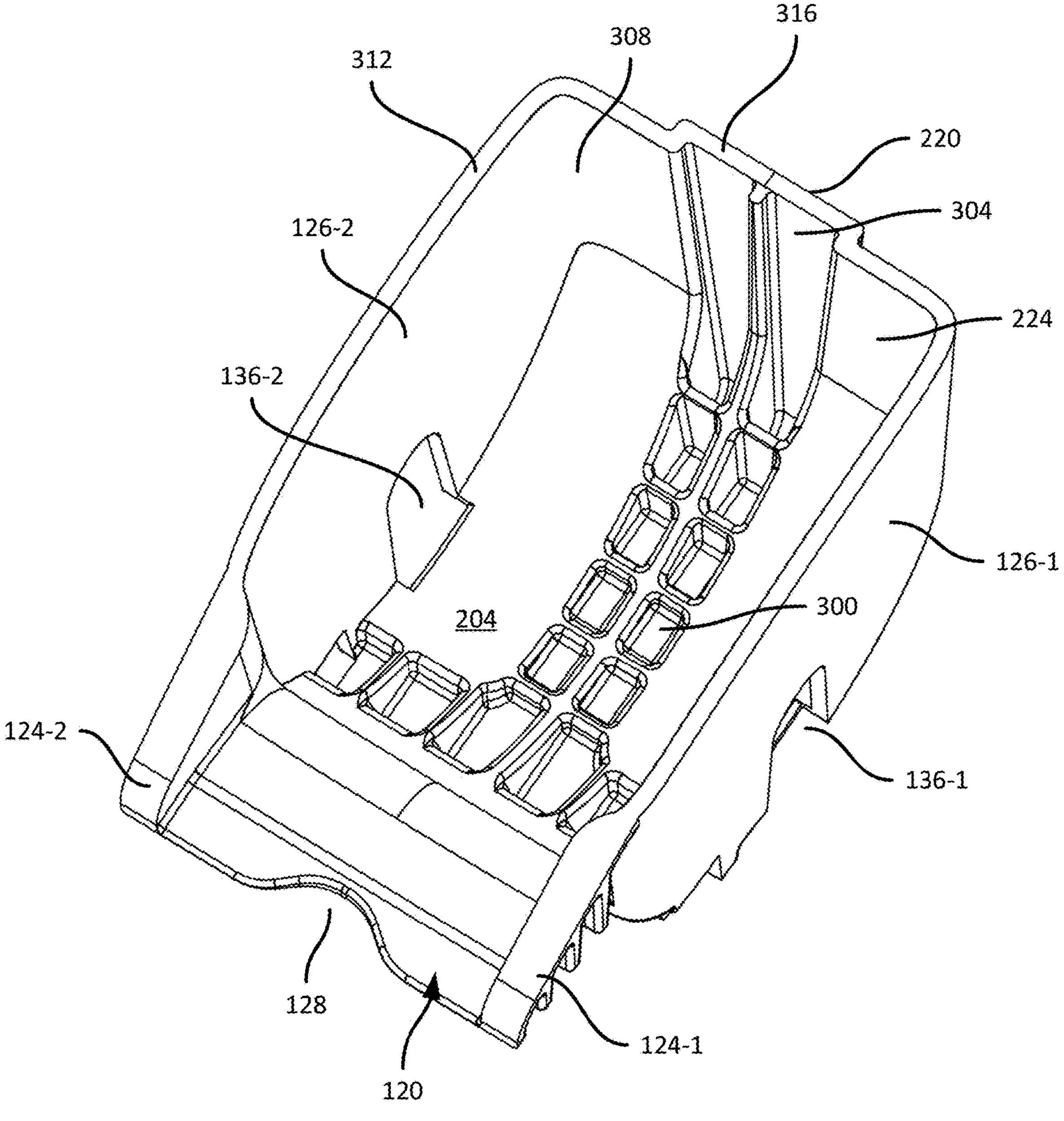
FIG. 3 is a perspective view of the media cartridge of FIG. 1, omitting a cover.

Turning to FIG. 3, certain internal feature of the base 104 are illustrated as the cover 108 is omitted. In particular, in addition to the side wall 126-2 and the window 136-2, FIG. 3 shows the internal structure of the alignment ridge 200 and the spine 220. In particular, the ridge 200 is formed from a plurality of cells 300 in the lower wall 204. The depth of the cells 300 varies based on the position of the cells, as the lower surface of the ridge 200 is planar (as shown in FIG. 2), while the lower wall 204 is curved. The use of cells 300 to form the ridge 200 enables the ridge 200 to retain structural rigidity while reducing material use compared to a cartridge 100 in which the ridge 200 is a solid component extending from the lower wall 204. The cells 300 can, therefore, enable manufacturing of the cartridge via injection molding, e.g. with a recyclable and/or biodegradable material. Examples of such materials include a paper foam containing paper pulp and starch. The spine 220 is also formed from a pair of cells 304 in the present example.

FIG. 3 also illustrates a media chamber 308, as mentioned previously. The chamber 308 has a mouth 312 (defined by the upper perimeter of the base 104) into which the media supply is placed, as will be discussed below in greater detail. The upper perimeter of the chamber 308 includes a ledge 316 defining a top of the alignment spine 220 and protruding rearward from the remainder of the mouth 312. The ledge 316 is substantially vertically aligned with the identification circuit 228 shown in FIG. 2. As will be seen below, the ledge 316 enables a lid of a printer to exert downwards pressure on the spine 220 when the cartridge 100 is installed within the printer.

Figure 4:
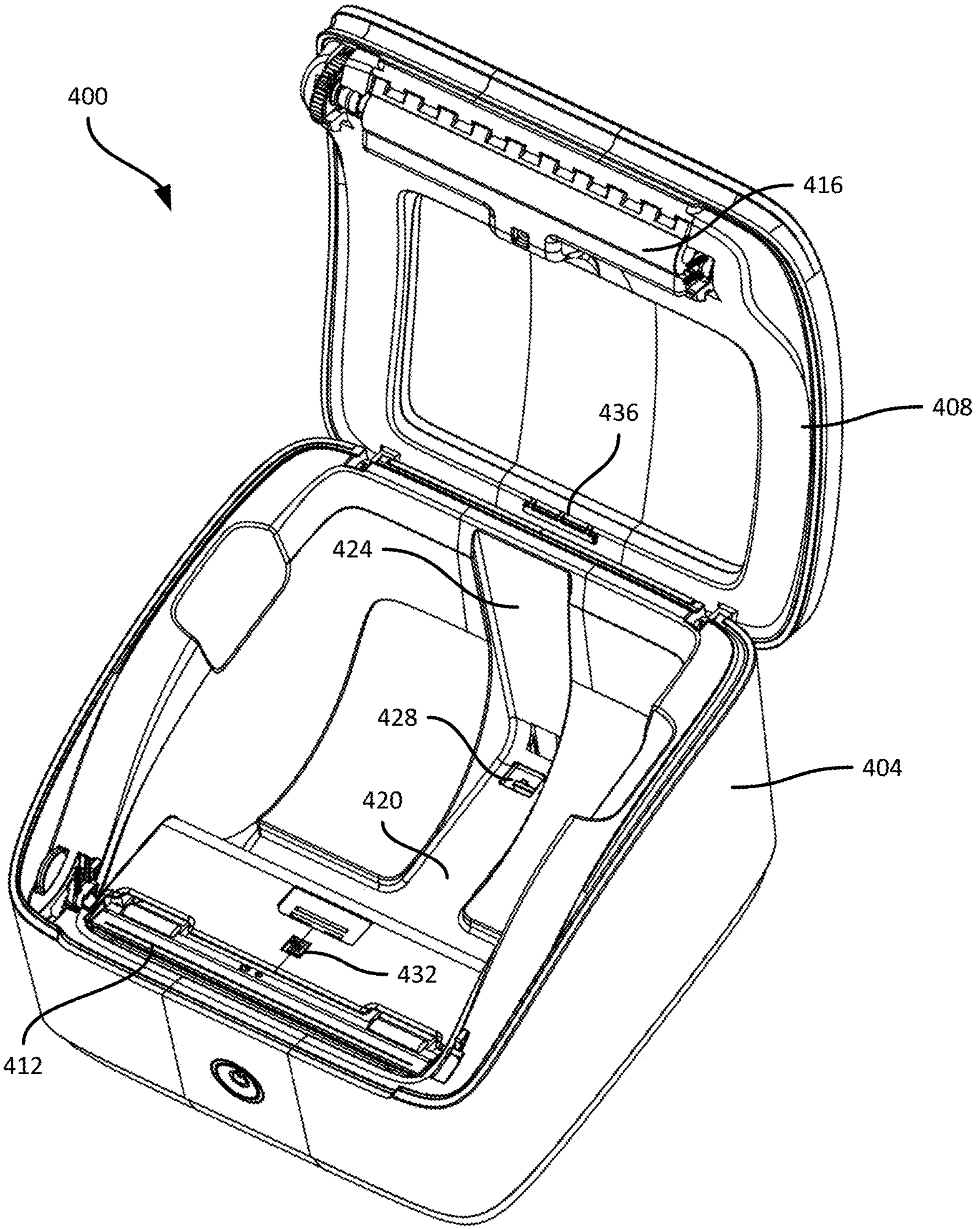
FIG. 4 is a diagram of a printer for use with the media cartridge of FIG. 1.

Turning to FIG. 4, certain features of an example printer 400 with which the cartridge 100 may be used will be discussed. The printer 400, e.g. a desktop label printer, includes a housing 404 to receive the cartridge 100, and a lid 408 to enclose the cartridge 100 within the housing 404 when the lid 408 is closed (the lid 408 is shown in an open position in FIG. 4). The housing 404 supports a print head assembly 412, and the lid 408 supports a platen roller 416 that, when the lid 408 is closed, cooperates with the print head 412 to form a nip through which media is drawn from the cartridge 100 for processing and dispensing from the printer 400.

Within the housing 404, the printer 400 includes an alignment channel 420 that, in the illustrated example, has a T shape complementary to the shape of the alignment ridge 200 discussed above. The housing 400 also defines a rear alignment channel 424 that is complementary with the shape of the spine 220 discussed above. Thus, as the cartridge 100 is inserted into the printer 400, the spine 220 engages with the channel 424 to guide the ridge 200 into the channel 420. The ridge 200 and spine 220 of the cartridge 100, together with the channels 424 and 420, may also prevent insertion of the cartridge 100 in an incorrect orientation (e.g. with the media outlet 112 facing towards the lid 408 rather than towards the print head 412).

The printer 400 also includes, within the channel 420, an electrical interface 428 configured to engage with the circuit 228 when the cartridge 100 is inserted into the housing 404. Further, the lid 408 can be configured to apply pressure to the cover 108 above the circuit 228 and the interface 428, to encourage full contact between the circuit 228 and the interface 428. In particular, the lid 408 includes a pressure bar 436 on an inner surface thereof. The pressure bar 436 is configured, when the lid 408 rotates from the illustrated open position to a closed position, to exert downwards pressure on the identification circuit 228 via the ledge 316 and spine 220. Such downwards pressure may serve to ensure contact between the circuit 228 and the interface 428.

Also shown in FIG. 4 is a sensor aperture 432. The sensor aperture 432 can contain a sensor (e.g. an optical sensor) to detect the presence of media. As will now be apparent, when the cartridge 100 is installed within the housing 404, the cutout 128 is disposed over the sensor aperture 432, such that the lower portion 120 of the media outlet 112 does not obstruct the above-mentioned sensor. The cutout 128, in the illustrated example, is open to form a bay in the leading edge of the lower portion 120. In other examples, the cutout can be closed, to form an opening through the lower portion 120 while the leading edge remains straight.

Figure 5:
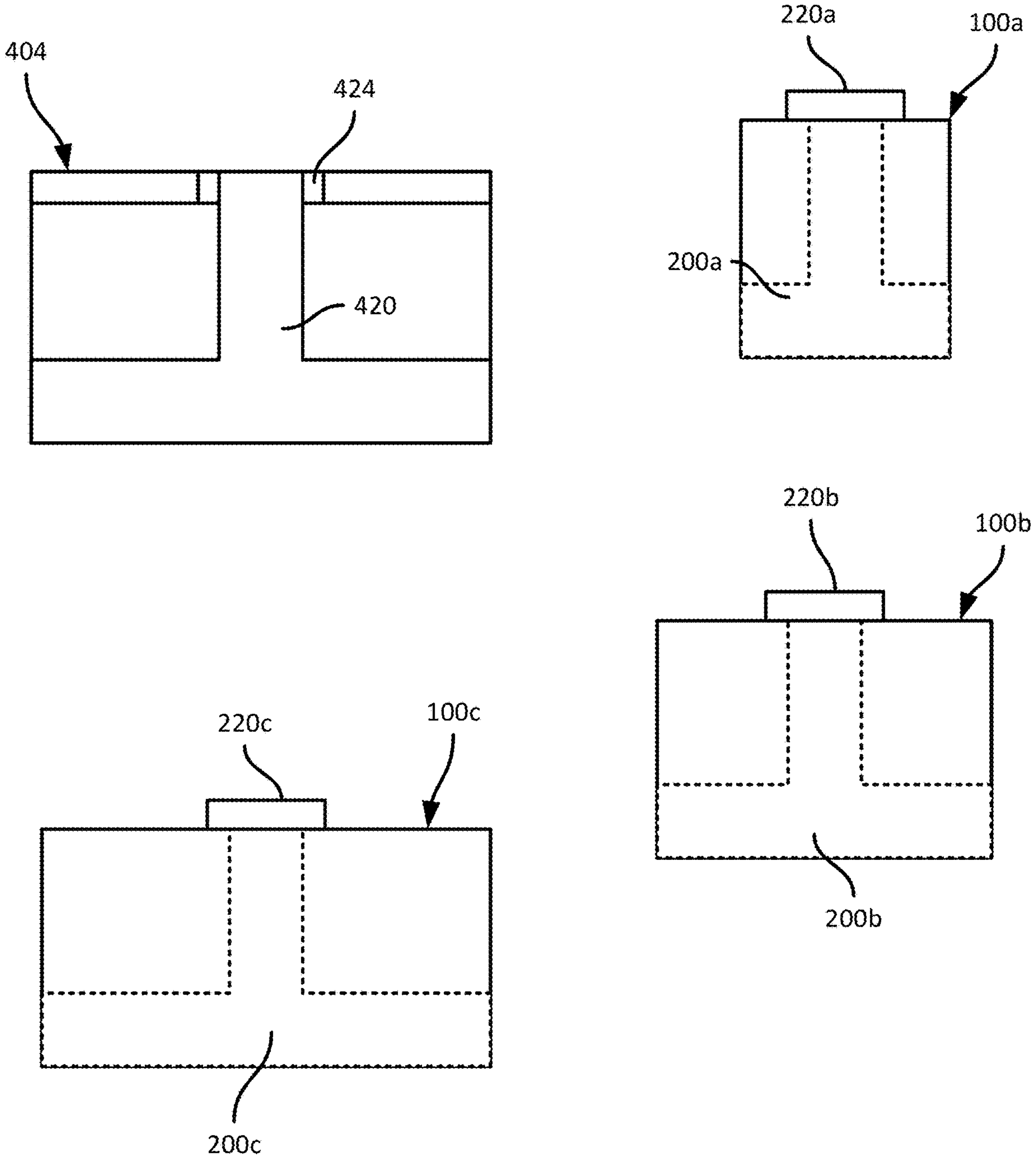
FIG. 5 is a diagram illustrating alignment channels in housing of the printer of FIG. 4, and complementary alignment structures of cartridges of various sizes.

Turning to FIG. 5, a simplified overhead view of the printer housing 404 is shown, illustrating the channels 420 and 424. Also shown are three example cartridges **100*a*, 100*b* and 100*c* of different sizes. For example, the cartridge 100*a* may contain labels with a width of two inches, while the cartridge 100*b* may contain labels with a width of three inches and the cartridge 100*b* may contain labels with a width of four inches (a wide variety of other label dimensions are also contemplated). Respective alignment ridges and spines 200*a*, 200*b*, 200*c* and 220*a*, 220*b* and 220*c* of each cartridge 100 are illustrated. As shown in FIG. 5, each cartridge 100 can be accommodated within the printer housing 404 and guided into position via engagement of the ridges 200 and spines 220 with the channels 420 and 424. Thus, a printer 400** sized to receive labels of widths up to four inches may also be compatible with cartridges containing narrower media.

Figure 6:
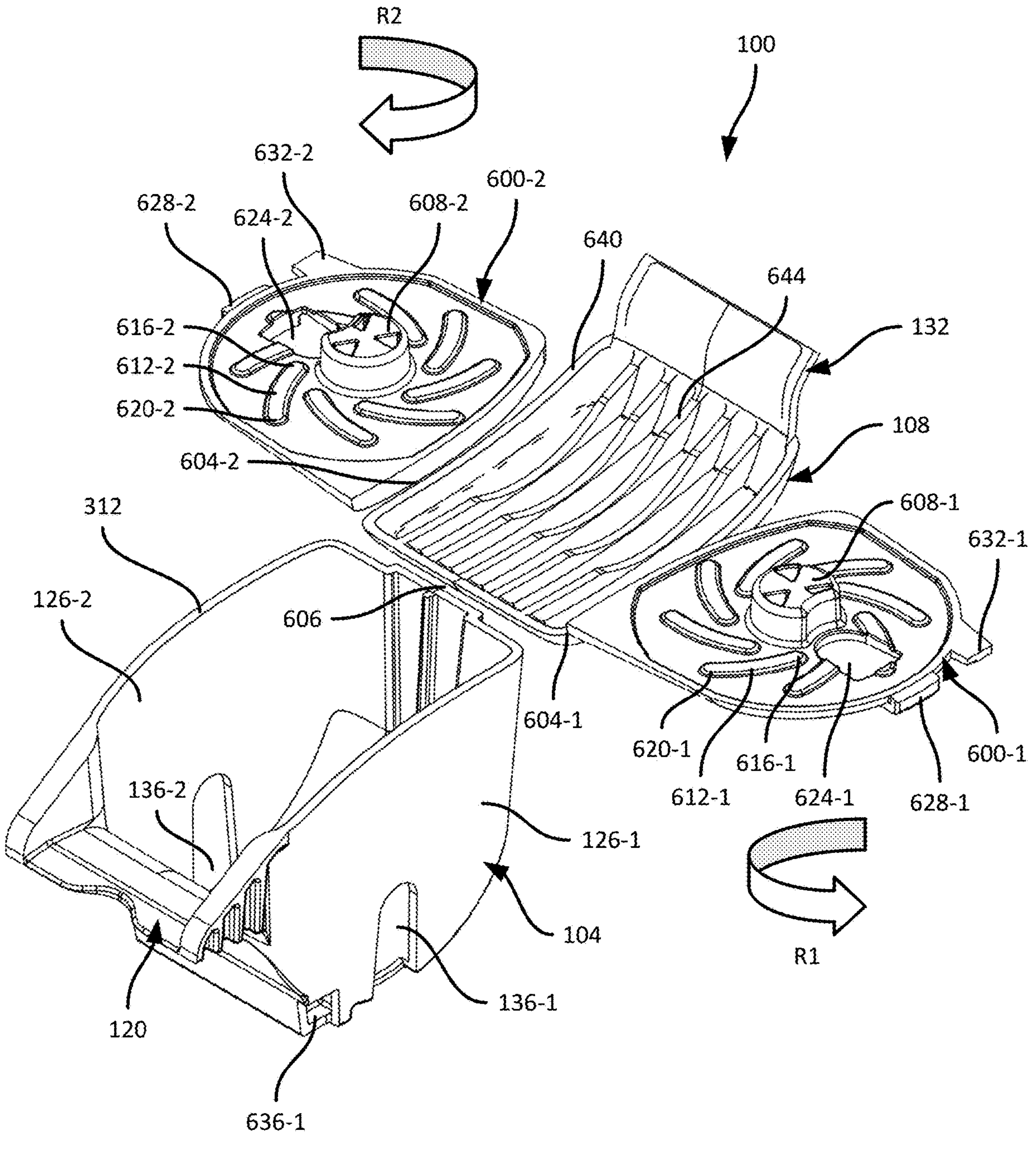
FIG. 6 is an open, unloaded view of the media cartridge of FIG. 1.

Referring now to FIG. 6, the loading and assembly of the cartridge 100 will be discussed in greater detail. FIG. 6 illustrates the cartridge 100 in a disassembled state, prior to loading of the cartridge 100 with media. As seen in FIG. 6, in addition to the base 104 and cover 108, the cartridge 100 includes first and second wings 600-1 and 600-2. The wings 600 are connected on opposing sides of the cover 108, e.g. via living hinges 604-1 and 604-2 that permit rotation of the wings 600 relative to the cover 108.

Referring now to FIG. 6, the cover 108 and wings 600 can be manufactured as a single integrated component (e.g. via injection molding as mentioned earlier), while the base 104 can be manufactured as a separate component. In some examples, however, the entire cartridge 100 can be manufactured as a single integrated component, e.g. via injection molding. In such examples, the cover 108 is connected to the base 104 via a hinge in the region 606 indicated in FIG. 6. The hinge between the cover 108 and base 104 can be implemented as a living hinge of the same material as the cover 108, wings 600 and base 104. In some examples, e.g. if a greater range of motion between the cover 108 and the base 104 is to be provided than a living hinge can accommodate, a separate hinge member can join the cover 104 and 108. For example, a paper hinge can be placed in a mold and the cover 108 and base 104 can be overmolded onto the paper hinge.

The wings 600 are configured to engage and support a spool of media. To that end, each wing 600 is a generally planar member supporting structural features on an inner surface (the surface visible in FIG. 6) thereof. The above-mentioned features include a spindle 608-1, 608-2 that is configured to engage with a core (e.g. a cylindrical cardboard core) of a media spool. When the wings 600 are rotated relative to the cover 108 to support the media spool, the spindles 608 align to form an axis of rotation about which the media spool rotates to dispense media.

The wings 600 can also each include at least one guide fin 612-1, 612-2. In the illustrated example, each wing 600 includes a set of guide fins 612 surrounding the spindle 608. Each guide fin 612 includes a leading end 616-1, 616-2 and a trailing end 620-1, 620-2. The ends 616 and 620 are referred to as leading and trailing in relation to the direction in which the media spool rotates related to the wings 600 when installed. As will be apparent in the discussion below, the direction of rotation of the media spool relative to the wing 600-1 is counter-clockwise (as indicated by the arrow R1). The direction of rotation of the media spool relative to the wing 600-2 is counter-clockwise (as indicated by the arrow R2). The leading ends 616, in other words, are the furthest extents of the fins 612 in the direction of rotation, while the trailing ends are the furthest extents of the fins 612 opposite the direction of rotation.

The guide fins 612 are angled inwards, towards the spindle 608. In other words, the leading ends 616 are closer to the spindle 608 than the trailing ends 620. Further, the fins 612 are configured to contact the media spool when the cartridge 100 is loaded and assembled. The angling of the fins 612 configures the fins 612 to guide the media on the spool towards the spindle 608, mitigating unwinding of the spool. When not mitigated, such unwinding can cause slack to accumulate in the media and negatively affect print quality. The fins 612 are curved in the present example, such that an inner edge of each fin 612 (closer to the spindle 608) is concave while the opposing outer edge is convex. In other examples, the fins 612 need not be curved.

Each wing 600 also includes a window 624-1, 624-2 therethrough. As will be shown below, the windows 624 are configured to align with the windows 136 in the side walls 126 of the base 104 when the cartridge 100 is assembled, such that the interior of the media chamber 308 is visible from the exterior of the cartridge 100. Each wing 600 can also include a block 628-1, 628-2 that is configured to engage with a corresponding one of the windows 136 to secure the wings 600 within the base 104, as will be discussed in greater detail below. The blocks 628 are disposed on the outer surfaces of the wings 600, and extend outwards from the outer surfaces.

In addition, each wing 600 can include a latch 632-1, 632-2, each configured to engage a corresponding opening 636 of the base 104 (an opening 636-1 is visible in FIG. 6). The latches 632, as shown in FIG. 6, extend from the distal edges (i.e. the edges furthest from the hinges 604) of the respective wings 600. In addition, each latch 632 extends from the corresponding wing 600 at or near a forward side of the wing 600, such that when the wing 600 is received in the base 104, the latch 632 is placed closer to the outlet 112 than to the rear wall 224. Together, the blocks 628 and the latches 632 secure the wings 600 to the base 104 when the cartridge 100 is assembled.

Certain additional features of the cover 108 are also visible in FIG. 6. In particular, the cover 108 includes a perimeter 640 that is configured to engage the mouth 312 of the base 104, to enclose the media chamber 308. The cover 108 can also include a set of internal ridges 644 for structural rigidity.

Figure 7:
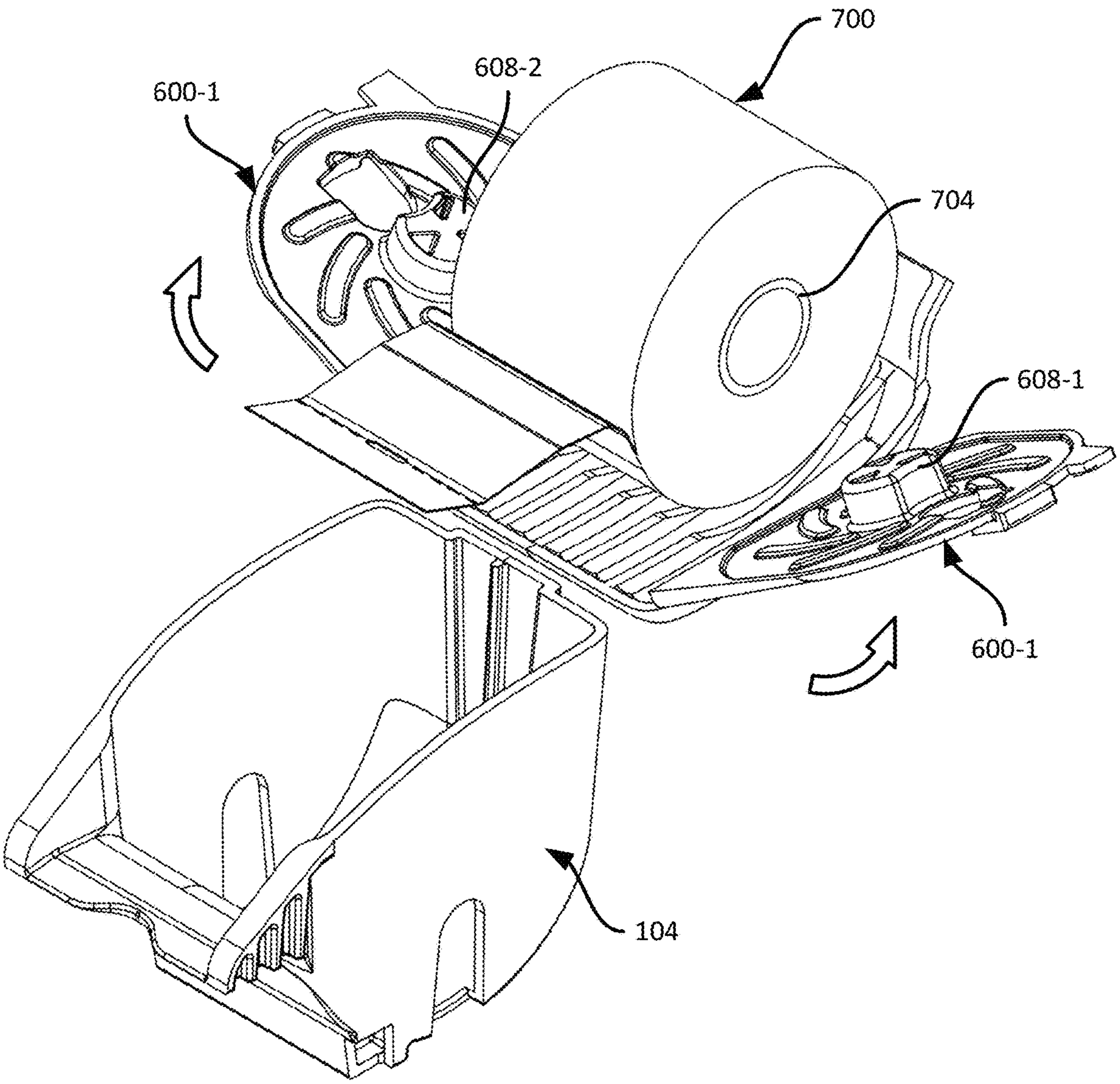
FIGS. 7 and 8 are diagrams illustrating the loading of the media cartridge of FIG. 6 with a media spool.

Turning now to FIG. 7, a process for loading the cartridge 100 will be discussed. To load the cartridge 100, a media spool 700 is placed adjacent to the cover 108 (specifically, the interior of the cover 108, near the ridges 644). The media spool 700 includes a length of labels or other media joined by a removable backing or the like and wound about a core 704, such as a cardboard cylinder. The wings 600 are then rotated relative to the cover 108, as shown by the curved arrows in FIG. 7, to close onto the media spool 700 such that the spindles 608 are received within opposing ends of the core 704. The spindles 608 thus support the media spool 700 and define an axis of rotation for the media spool 700.

Figure 8:
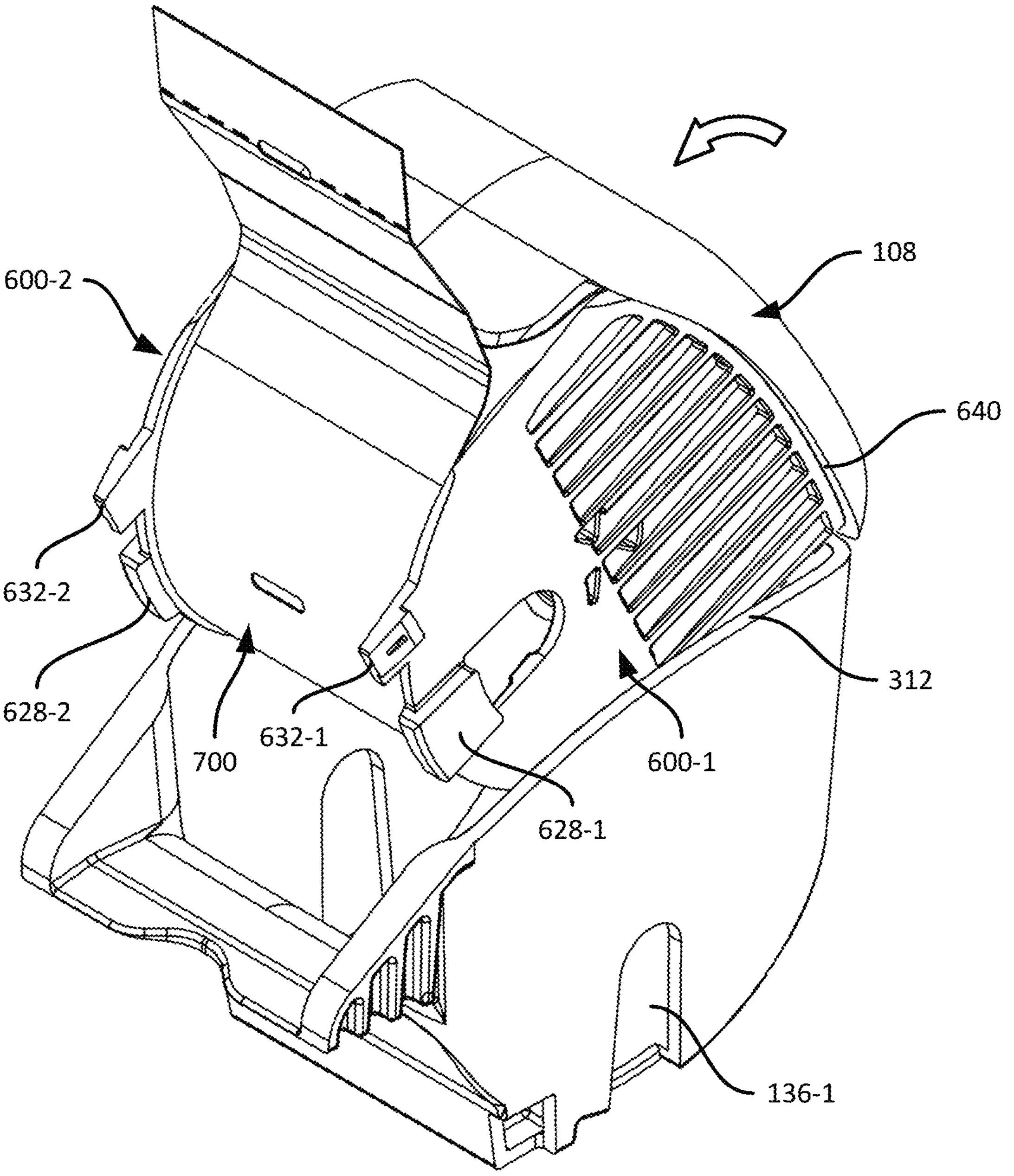

Turning to FIG. 8, when the wings 600 come into contact with the sides of the media spool 700, the wings 600 are inserted into the media chamber 308 of the base 104. For example, when the cover 108 is attached to the base 104 (e.g. by a hinge in the region 606 as mentioned earlier), the cover 108 is rotated relative to the base 104 in the direction shown by the curved arrow in FIG. 8.

Figure 9:
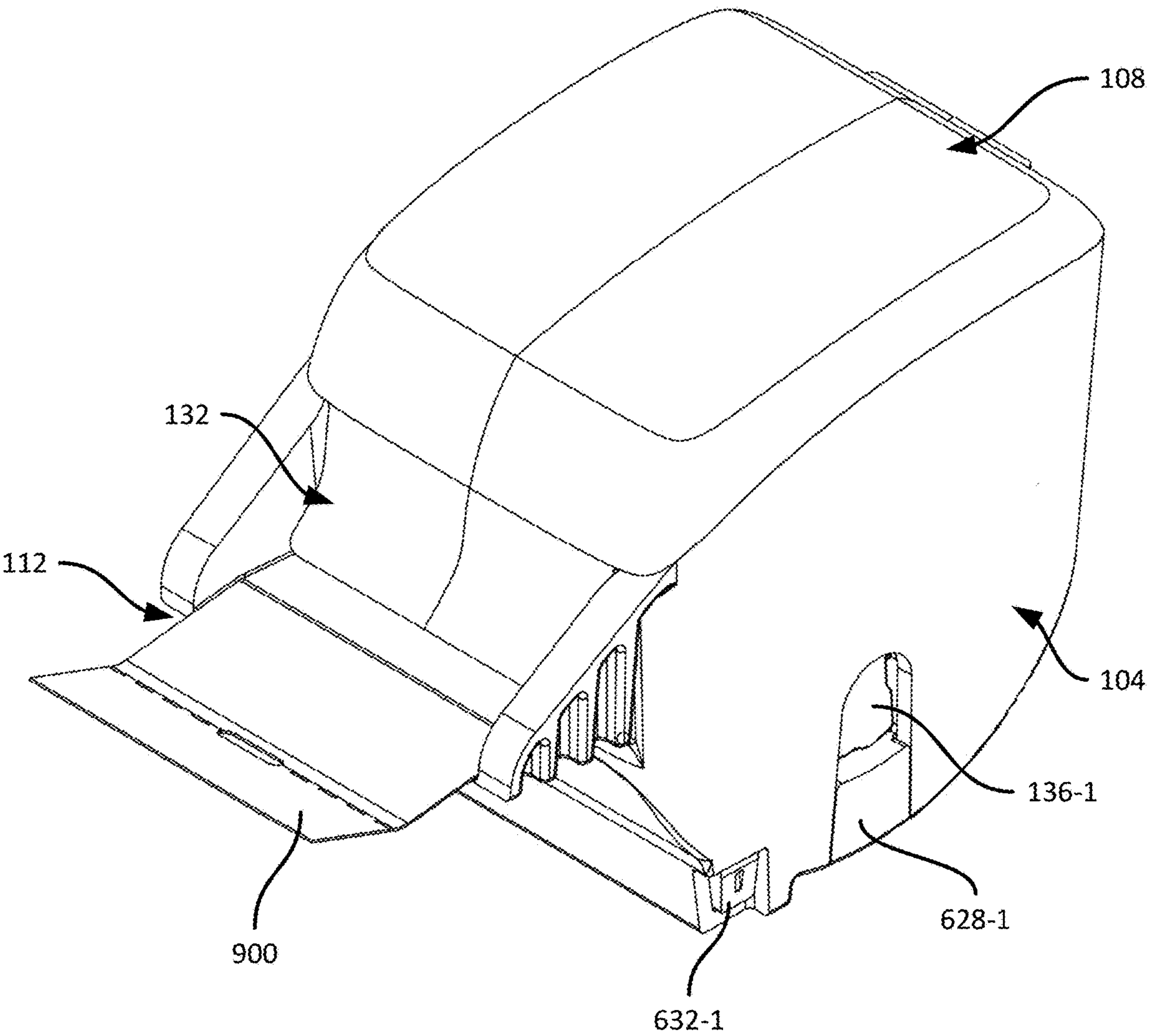
FIG. 9 is an isometric view of a loaded media cartridge, taken from above.

As the wings 600 and the media spool 700 travel into the base 104, as shown in FIG. 9, the blocks 628 engage with the windows 136, and the latches 632 engage with the openings 636. The blocks 628 and the windows 136 have complementary wedge shapes, with upper ends of the blocks 628 and windows 136 (that is, ends closer to the cover 108 than to the lower wall 204 of the base 104) being narrower than lower ends of the blocks 628 and windows 136. The wedge shape of the blocks 628 and windows 136 mitigates against upwards motion of the cover 108 relative to the base 104, which would retract the wings 600 out of the media chamber 308. In addition, as seen in FIG. 9, a height of each block 628 is smaller than a height of the corresponding window 136, such that a portion of the window 136 remains unobstructed by the block 628 to permit visibility of the media chamber 308 through the unobstructed portion.

The blocks 628 and the latches 632 thus prevent the wings 600 and cover 108 from returning towards the open positions shown in FIGS. 6-8, and may also mitigate movement of the wings 600 (and therefore of the media spool 700) within the media chamber 308. As also shown in FIG. 9, media 900 from the spool 700 extends from the outlet 112, to be engaged by the nip of the printer 400 when the cartridge 100 is installed within the printer 400. The upper portion 132 of the outlet 112 defines a retaining wall that contacts the media 900 and mitigates retraction of the media 900 into the chamber 308, for example during transport and handling of the cartridge 100 prior to installation.

Figure 10:
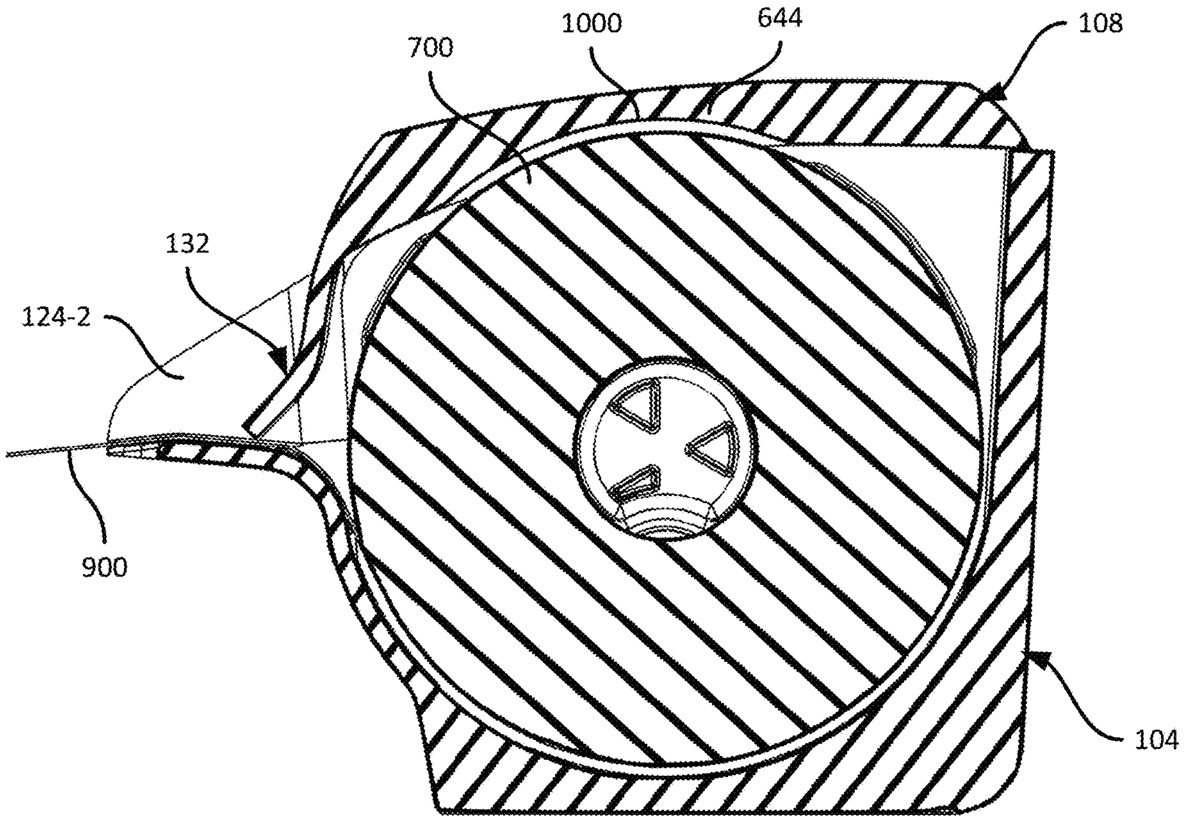
FIG. 10 is a cross-sectional view of the loaded media cartridge of FIG. 9.

Turning to FIG. 10, a cross-sectional view of the cartridge 100 and media spool 700 is shown. To dispense the media 900 from the spool 700, the spool 700 rotates clockwise (in the orientation shown in FIG. 10). As also shown in FIG. 10, the ridges 644 within the cover 108 have curved cutout portions 1000 shaped to accommodate the spool 700. The cutouts 1000 are spaced apart from the spool 700 such that in operation, the ridges 644 do not contact the spool 700. However, during transport and handling, the spool 700 may contact the ridges 644, which act to limit the range of movement of the spool 700 within the chamber 308.

Figure 11:
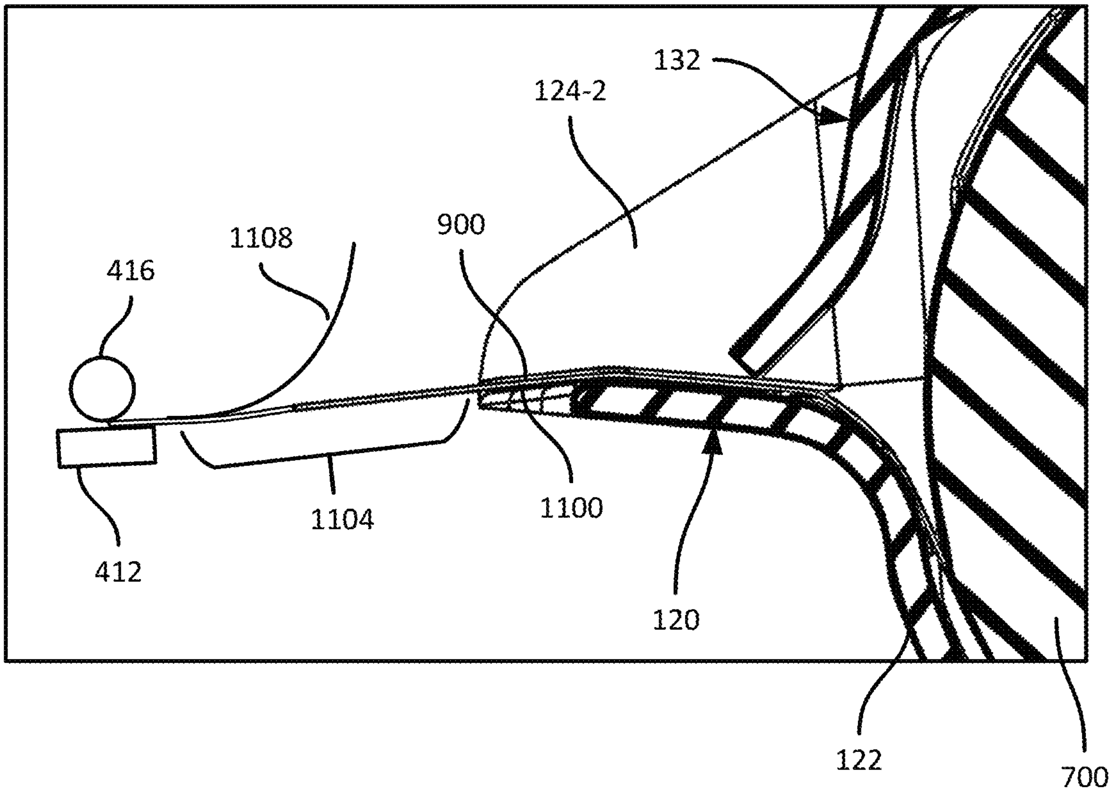
FIG. 11 is a detail view of a media outlet of the media cartridge of FIG. 10.
Figure 12A:
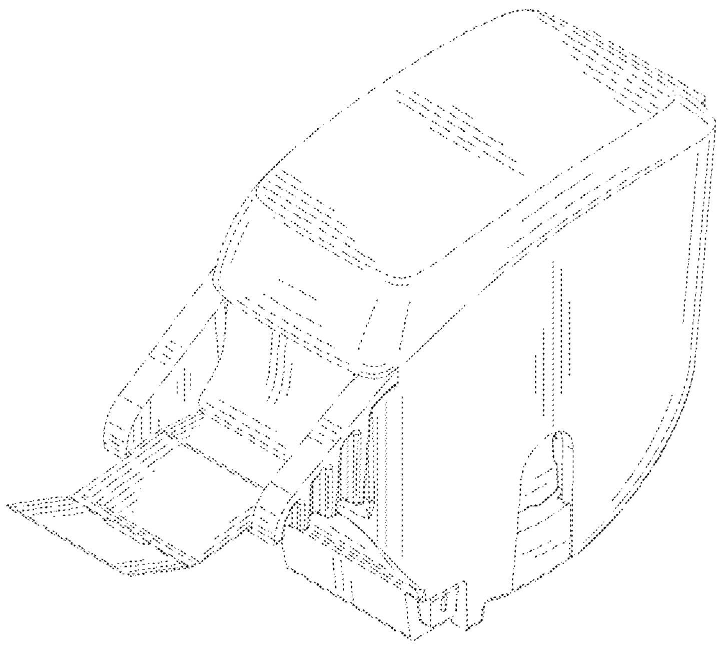
FIGS. 12A and 12B are isometric views of another example media cartridge.
Figure 12B:
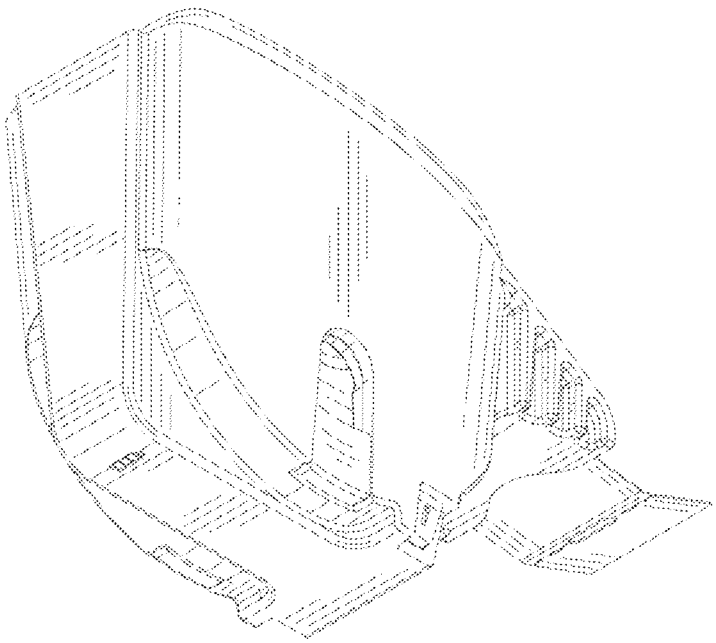
Figure 13A:
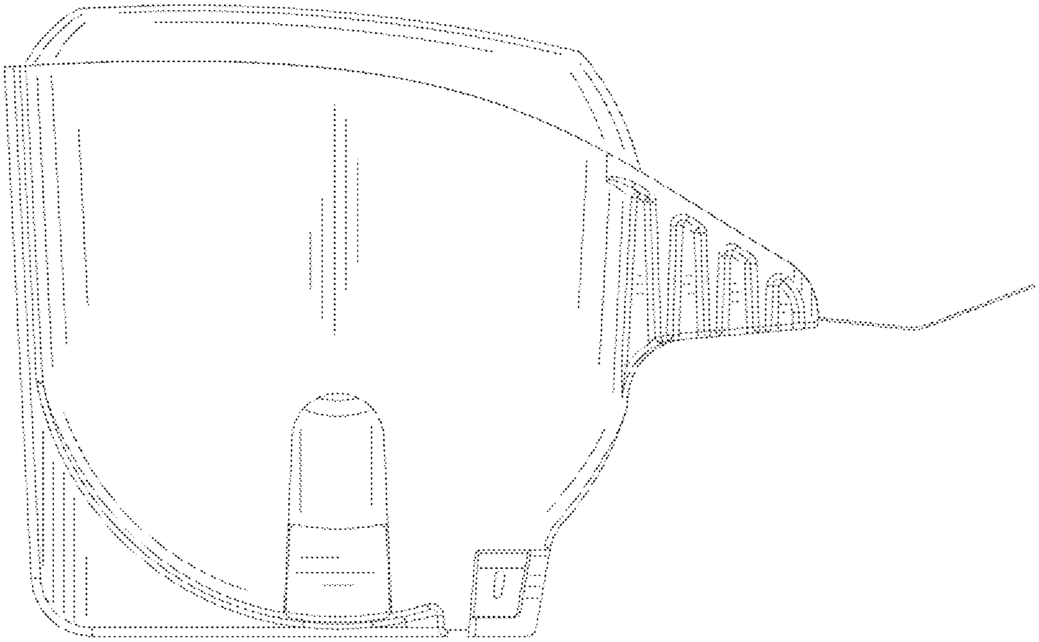
FIGS. 13A and 13B are right and left side views, respectively, of the media cartridge of FIGS. 12A and 12B.
Figure 13B:
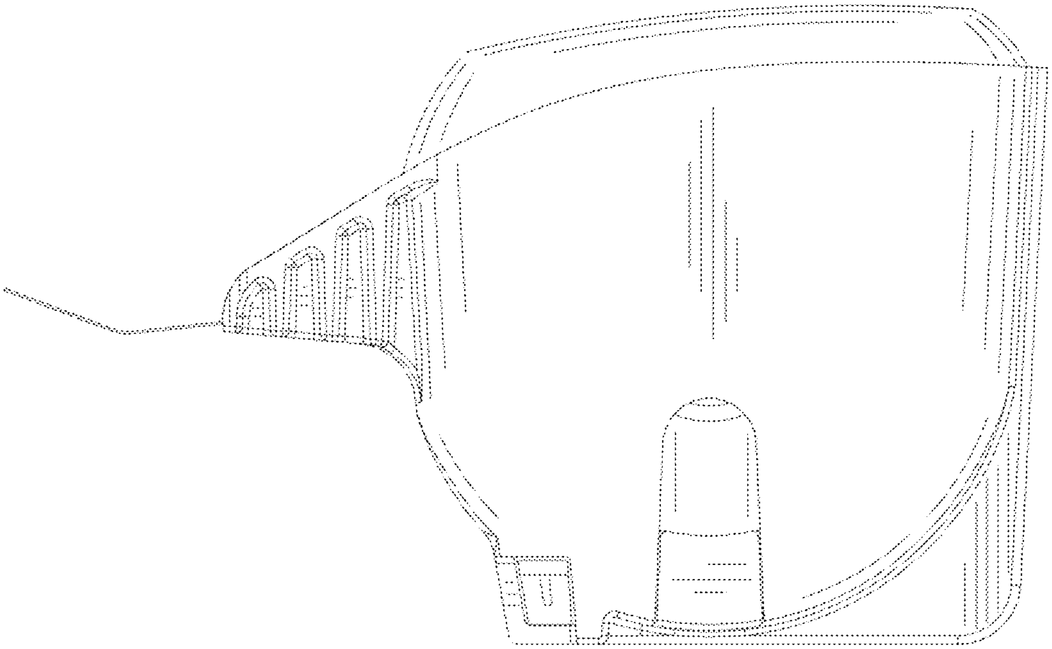
Figure 14A:
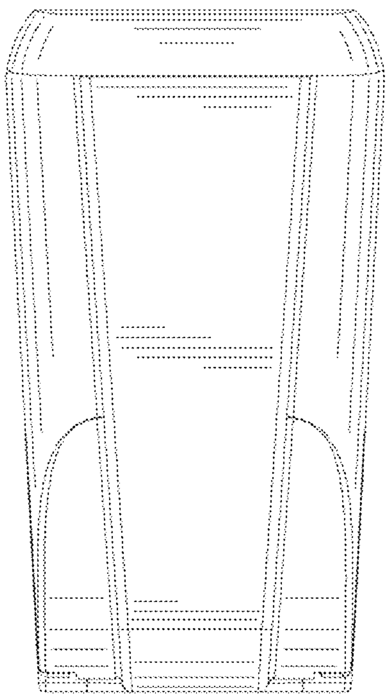
FIGS. 14A and 14B are rear and front views, respectively, of the media cartridge of FIGS. 12A and 12B.
Figure 14B:
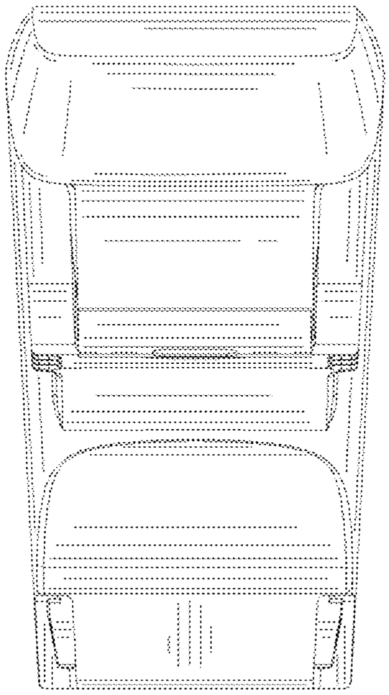
Figure 15:
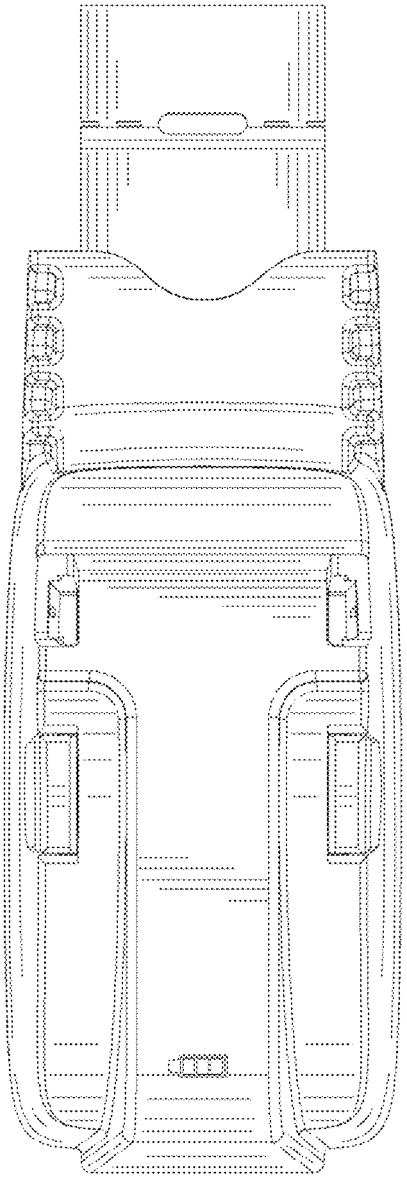
FIG. 15 is a bottom view of the media cartridge of FIGS. 12A and 12B.
Figure 16:
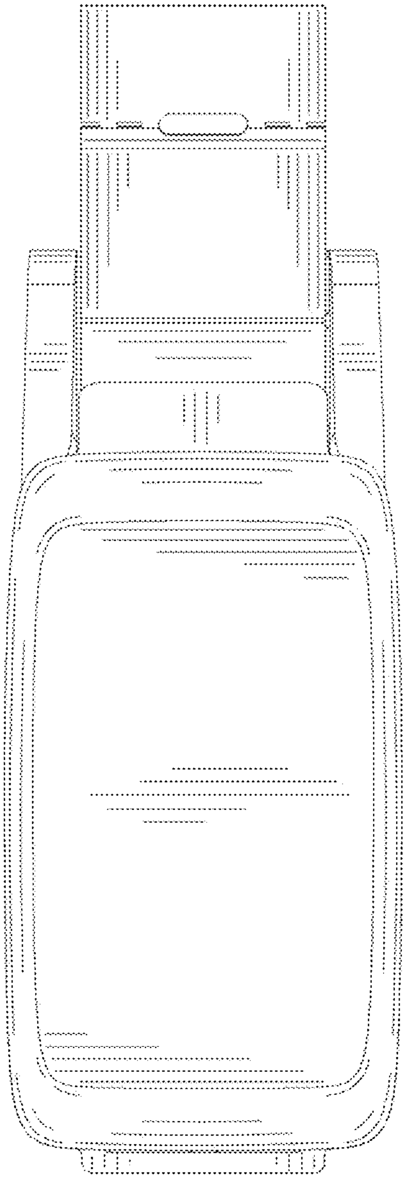
FIG. 16 is a top view of the media cartridge of FIGS. 12A and 12B.

FIG. 11 illustrates a detail view of the outlet 112 and certain components of the printer 400. As seen in FIG. 11, the lower portion 120 of the outlet 112 includes a surface 1100 that defines an exit angle for the media 900. The printer 400 defines a media path 1104, e.g. with one or more guide structures 1108, towards the nip formed by the print head 412 and the platen roller 416. As seen in FIG. 11, the exit angle defined by the surface 1100 matches the angle of the media path 1104.

Figure 17A:
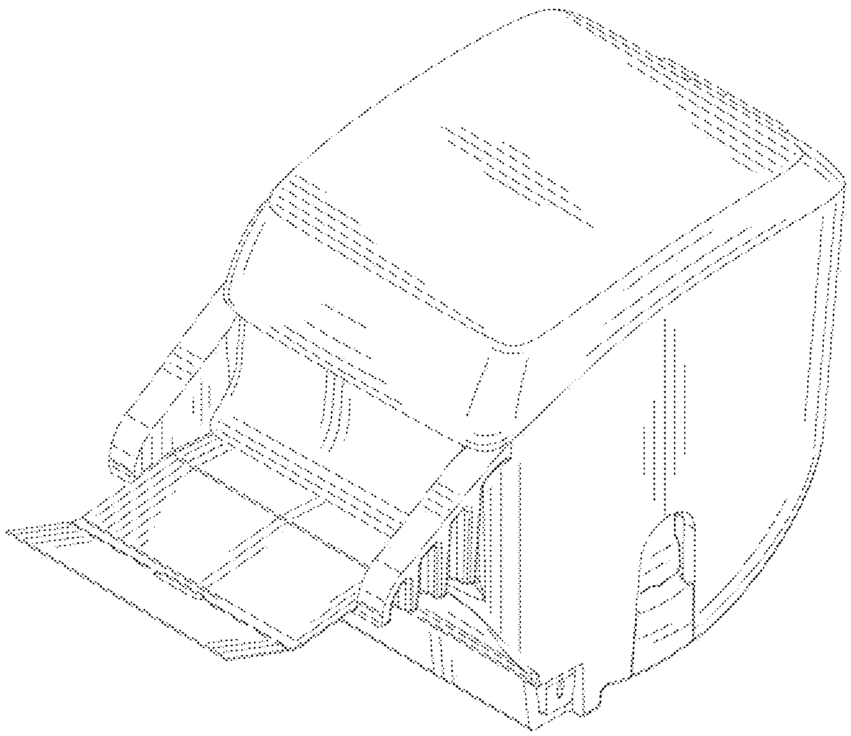
FIGS. 17A and 17B are isometric views of a further example media cartridge.
Figure 17B:
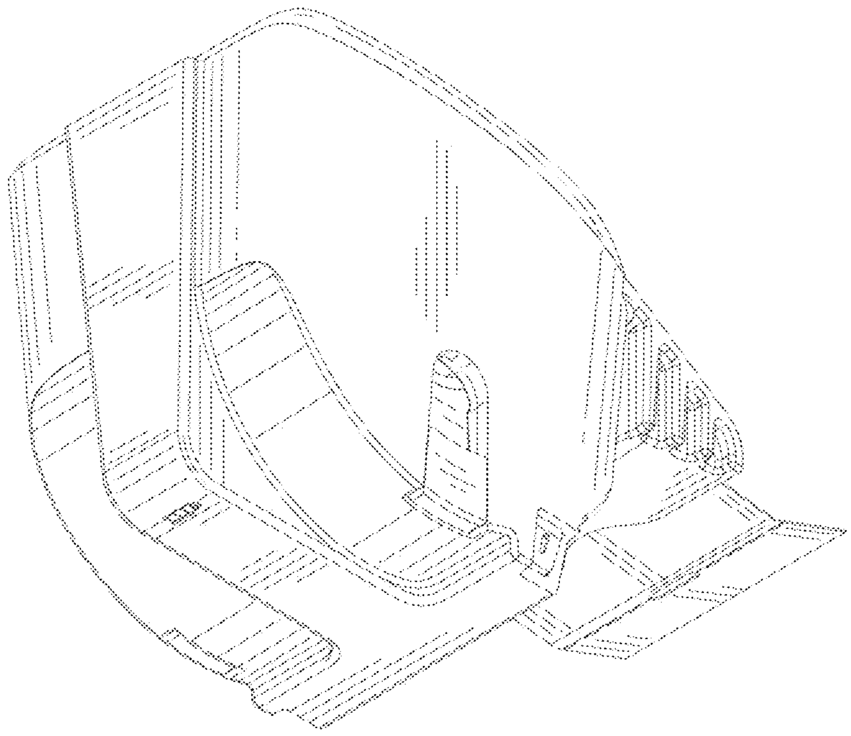
Figure 18A:
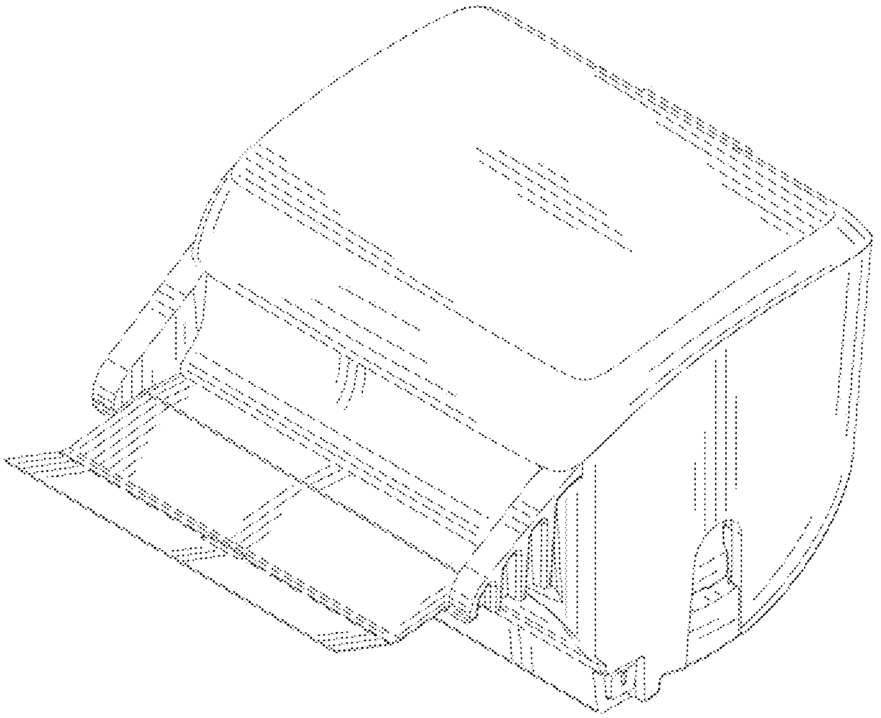
FIGS. 18A and 18B are isometric views of an additional example media cartridge.
Figure 18B:
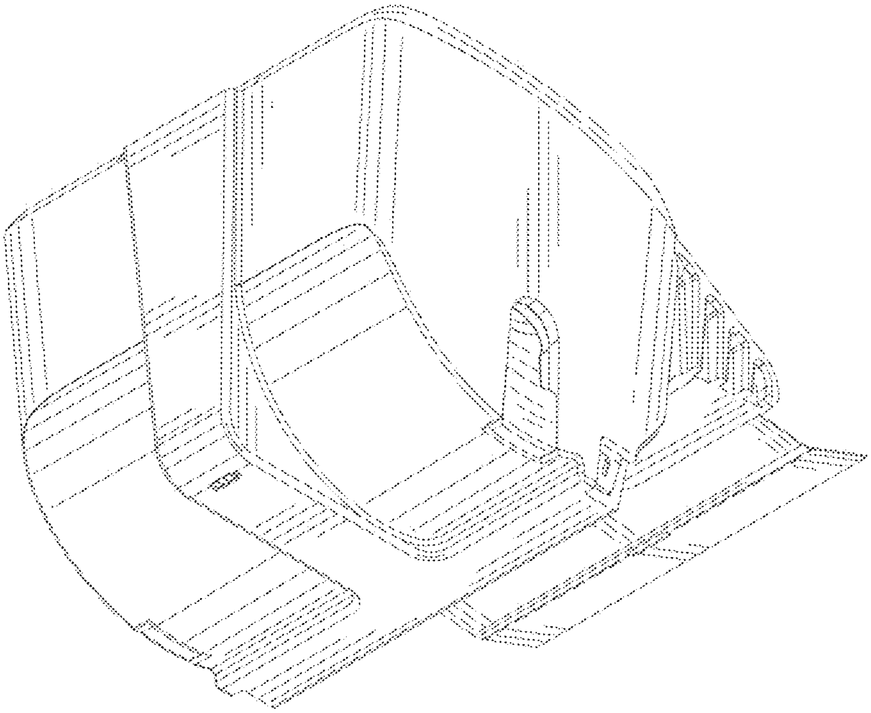

FIGS. 12A, 12B, 13A, 13B, 14A, 14B, 15 and 16 depict various views of an example media cartridge, e.g. configured to accept a first width of media such as one-inch wide labels. FIGS. 17A and 17B depict a media cartridge configured to accept a second width of media (e.g. two-inch wide labels). FIGS. 18A and 18B depict a media cartridge configured to accept a third width of media (e.g. four-inch wide labels).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A media cartridge, comprising:
a base including:
a lower wall,
a rear wall,
a forward wall opposite the rear wall, and
a first side wall,
a second side wall opposite the first side wall, and
an open top opposite the lower wall,
a first opening formed in the first side wall and the lower wall, and
a second opening formed in the second side wall and the lower wall,
the lower wall, rear wall, forward wall, first side wall, and second side wall defining a media chamber accessible via the open top, the first opening, and the second opening;
a lower portion of a media outlet; and
a cover operatively coupled to the base via a first hinge;
a first wing and a second wing configured to support a media spool therebetween, the first wing and the second wing operatively coupled to the cover;
the first wing including a first block extending from a terminal end of the first wing and third opening disposed proximate to the first block,
the second wing including a second block extending from a terminal end of the second wing and a fourth opening disposed proximate to the second block,
wherein, when the cover is in a closed position, the first and second wings nest within the media chamber and the cover covers the open top of the base, the first block extends into the first opening, the third opening aligns with the first opening, the second block extends into the second opening, and the fourth opening aligns with the second opening.

2. The media cartridge of claim 1, wherein a first portion of the first opening formed in the lower wall receives a first portion of the first block and a second portion of the first opening formed in the first side wall receives a second portion of the first block when the cover is in the closed position.

3. The media cartridge of claim 1, wherein a first portion of the second opening formed in the lower wall receives a first portion of the second block and a second portion of the second opening formed in the second side wall receives a second portion of the second block when the cover is in the closed position.

4. The media cartridge of claim 1, wherein the first wing includes a spindle and the third opening is disposed between the first block and the spindle.

5. The media cartridge of claim 1, wherein the second wing includes a spindle and the fourth opening is disposed between the first block and the spindle.

6. The media cartridge of claim 1, wherein the first wing and second wing are movable to facilitate receipt of the media spool.

7. The media cartridge of claim 1, wherein each of the first wing and second wing includes a spindle to rotatably support a core of the media spool.

8. The media cartridge of claim 1, wherein at least one of the first wing and second wing includes an angled guide fin to contact an end of the media spool.

9. The media cartridge of claim 1, the hinge connecting the cover to the base is a living hinge.

10. The media cartridge of claim 1, wherein the forward wall defines a lower portion of the media outlet that includes a surface defining an exit angle for dispensing media from the media chamber.

11. The media cartridge of claim 10, wherein the exit angle matches an angle of a media path defined by a printer.

12. The media cartridge of claim 10, wherein the cover defines an upper portion of a media outlet that includes a retaining wall configured to contact an upper surface of media dispensed from the media chamber.

13. The media cartridge of claim 1, wherein the lower wall of the base includes an alignment ridge configured to engage with a complementary channel of a printer housing.

14. The media cartridge of claim 13, further comprising an identification circuit disposed on the alignment ridge.

15. The media cartridge of claim 14, wherein the identification circuit is disposed on a lower surface of the alignment ridge to engage with an electrical interface in the channel of the printer housing.

16. The media cartridge of claim 1, wherein the rear wall of the base includes an alignment spine extending therefrom, configured to engage a complementary channel of a printer housing.

17. The media cartridge of claim 1, wherein the base includes a fifth opening, and wherein at least one of the first wing and second wing includes a latch configured to engage the fifth opening to lock the cover in the closed position.

18. The media cartridge of claim 1, wherein the first and second blocks are configured to lock the cover in the closed position.

19. A method comprising:

moving at least one of a first wing or a second wing to secure a spool of media between the first wing and the second wing, the first wing including a first spindle and the second wing including a second spindle, the first and second spindles supporting the spool of media;

rotating a cover about a hinge connecting the cover to a base to move the cover to a closed position, the first and second wings being operatively coupled to the cover and nesting within the base to position the spool of media within a media chamber of the base;

receiving a first block extending from the first wing in a first opening formed in a lower wall and a first side wall of the base;

receiving a second block extending from the second wing in a second opening formed in the lower wall and a second side wall of the base; and in response to the cover being move to the closed position, the first block being received in the first opening, and the second block being received in the second opening, aligning a third opening disposed between the first block and the first spindle in the first wing with the first opening in the first side wall and aligning a fourth opening disposed between the second block and the second spindle in the second wing with the second opening in the second side wall.

* * * * *